United States Patent
Kolbeck

(10) Patent No.: US 7,080,781 B1
(45) Date of Patent: Jul. 25, 2006

(54) METHOD AND DEVICE FOR SAVING AND RETRIEVING PIN CODES

(75) Inventor: Alexander Kolbeck, Weilheim (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/926,517

(22) PCT Filed: May 25, 2000
(Under 37 CFR 1.47)

(86) PCT No.: PCT/EP00/04781

§ 371 (c)(1),
(2), (4) Date: Apr. 3, 2003

(87) PCT Pub. No.: WO00/74003

PCT Pub. Date: Dec. 7, 2000

(30) Foreign Application Priority Data

May 27, 1999 (DE) ................................. 199 24 232

(51) Int. Cl.
*G06K 7/08* (2006.01)
(52) U.S. Cl. ................ 235/451; 235/380; 235/382
(58) Field of Classification Search ............... 235/375, 235/379, 382, 382.5, 383, 451; 705/64, 70–72; 380/29, 30, 259, 260
See application file for complete search history.

(56) References Cited

U.S. PATENT DOCUMENTS

| 4,758,718 | A | * | 7/1988 | Fujisaki et al. | ............. | 235/487 |
| 4,801,787 | A | * | 1/1989 | Suzuki | ............. | 235/380 |
| 4,847,803 | A | * | 7/1989 | Miyano | ............. | 235/382 |
| 5,285,055 | A | * | 2/1994 | Oonakahara et al. | ....... | 235/380 |
| 5,606,614 | A | * | 2/1997 | Brady et al. | ............. | 713/184 |
| 5,742,035 | A | * | 4/1998 | Kohut | ............. | 235/380 |
| 5,757,918 | A | * | 5/1998 | Hopkins | ............. | 705/67 |
| 6,026,491 | A | * | 2/2000 | Hiles | ............. | 713/202 |
| 6,070,141 | A | * | 5/2000 | Houvener et al. | ............. | 705/1 |
| 6,182,894 | B1 | * | 2/2001 | Hackett et al. | ............. | 235/380 |
| 6,227,447 | B1 | * | 5/2001 | Campisano | ............. | 235/380 |

FOREIGN PATENT DOCUMENTS

| EP | 0 637 004 A | 2/1995 |
| GB | 2 274 184 A | 7/1994 |
| JP | 59212976 A | 12/1984 |
| WO | 99 56520 A | 11/1999 |

* cited by examiner

*Primary Examiner*—Ahshik Kim
(74) *Attorney, Agent, or Firm*—Bacon & Thomas, PLLC

(57) ABSTRACT

A method and apparatus for storing and retrieving a number of PIN codes for protected-access devices, in particular smart cards and magnetic stripe cards, involves storage of the individual PIN codes together with a unique feature of the associated protected-access device in a special apparatus, in particular a pocket card reader. The data stored in the pocket card reader can be accessed by a freely selected access code. By entry of the access code and the unique feature into the pocket card reader, the PIN number associated with the unique feature is found and indicated on a display for a short time. The unique feature may be a serial number that is inputted into the pocket card reader via a keyboard or automatically determined and used by the pocket card reader. The stored unique features and particular associated individual PIN codes may be encoded by means of the access code before they are stored. The access code remains stored as long as it is required for encoding or decoding.

16 Claims, 2 Drawing Sheets

METHOD AND DEVICE FOR SAVING AND RETRIEVING PIN CODES

BACKGROUND OF THE INVENTION

1. Field of the Invention

This invention relates to a method and apparatus for storing and retrieving a number of personal identification numbers (PINs) for protected-access devices, in particular smart cards and magnetic stripe cards.

2. Description of Related Art

Nowadays many devices have protected access through personal identification numbers. PINs are granted in particular for smart cards, money cards, ID cards as well as access-protected software and the like. Access is only possible after the particular PIN code is entered. The PIN owner must remember the PINs so that only he can have knowledge of them. The constantly rising number of PINs to be remembered is a problem since human memory is limited and the PINs are usually not freely selectable and therefore difficult to remember.

EP-A-0 742 532 discloses a method and apparatus for storing and retrieving PIN codes easily and safely. The proposal is to store the secret PIN code in an externally unreadable primary memory and to store a freely selectable personal code more easily remembered by the PIN code owner in a secondary memory. If the PIN code owner has forgotten the secret PIN code he inputs the personal code into the apparatus, and if a comparison performed in a microprocessor matches the personal code stored in the secondary memory a display indicates for a predetermined time period the secret PIN code stored in the primary memory. A plurality of secret PIN codes can also be stored in the primary memory that are indicated on the display one after the other by means of the same personal code. EP-A-0 637 004 likewise discloses such a method at the end of the introduction to the description.

The solutions proposed in the prior art have the disadvantage that the owner of a plurality of secret PIN codes must remember not only the more easily remembered personal code but also at least which smart card or magnetic card the stored and retrieved secret PIN codes are to be assigned to. With the constantly increasing number of devices with protected access through PINs, this proposed solution is unsatisfactory.

The objective of the present invention is therefore to provide a method and apparatus for storing and retrieving a number of PIN codes by which a single, freely selectable personal code permits retrieval of exactly the secret PIN code associated with the particular protected-access device.

Unlike known systems for storing and retrieving a number of PIN codes, the invention provides for a unique feature of the particular associated protected-access device, for example the serial number of a smart card or an automatically measured property of the chip contained in the smart card, to be stored in addition to each stored PIN code. Between each stored PIN code and the associated stored unique feature of the particular device or smart card a unique firm link is generated. Upon retrieval of an individual PIN code for a protected-access device, two entries are made: firstly a previously freely selected access code which is the same for each retrieval process and therefore easily remembered, and secondly the unique feature of the protected-access device or smart card whose individual PIN is to be retrieved. The access code known only to the owner of the individual PIN guarantees that the individual PINs cannot be spied out by third parties. Entry of the unique feature is required in order to retrieve the associated individual PIN via the unique firm link. The individual retrieved PIN can then be indicated.

The inventive method and apparatus, through the particular linking of the secret PIN codes with the unique feature of the associated protected-access device, thus offer the advantage of permitting safekeeping and accurate retrieval of different PIN codes by means of a single, freely selectable access code.

For retrieval of the PIN code it is irrelevant whether the freely selected access code or the unique feature is entered first. The individual PIN is in any case outputted only if both the entered access code was permissible and the entered unique feature matches one of the stored unique features.

The access code and/or unique features and/or PIN codes are advantageously stored in encoded form. This makes it harder for a third party who has procured access to the memory areas to detect the relevant contents of the memories.

SUMMARY OF THE INVENTION

In a special embodiment of the method it is provided that the access code serves as a key for encoding the unique features and/or PIN codes and remains stored only as long as it is required for encoding said data. Upon retrieval of an individual PIN the unique feature of that device whose individual PIN is to be retrieved is entered and encoded by means of the access code likewise to be entered, a comparison then taking place with the previously stored and identically encoded unique features. Comparison of the feature entered in encoded form with the feature stored in encoded form thus permits two tests to be performed simultaneously: firstly, whether the access code is permissible and, secondly, whether the entered unique feature matches one of the stored unique features. If the access code is impermissible or no corresponding unique feature is stored, the comparison turns out, a wrong PIN code not stored is outputted. If the comparison turns out positive, the individual PIN code stored in encoded form is decoded with the entered access code and outputted. The access code is then deleted.

In order to increase the protection of the stored data from unauthorized access, the PIN codes can be encoded also—optionally in addition to the above-described encoding—by the particular unique feature of the protected-access device associated with the PIN code forming the key.

The PIN codes are kept most safely if the freely selected access code is only stored briefly, i.e. is no longer present after deletion, the stored unique features are present encoded with the access code, and the particular associated PIN codes are present encoded with the access code, on the one hand, and with the associated encoded unique feature, on the other hand. Decoding and subsequent outputting of the PIN codes then take place in the reverse order solely through entry of the access code and the particular unique feature of the protected-access device whose individual PIN code is to be retrieved.

The protected-access devices may be in particular smart cards and magnetic stripe cards. The unique feature of a magnetic stripe card may be for example its serial number, which must be entered manually in addition to the access code. In particular with smart cards, the unique feature may be not only the serial number but also a physical property characteristic of the particular chip. Such a physical property may be for example the data processing speed characteristic of each chip, which is determined using a defined algorithm.

The time it takes the chip to execute the given algorithm serves as the unique feature of the smart card.

The inventive method can advantageously be carried out with a modified pocket card reader. Pocket card readers are used for reading the freely accessible data that are permanently stored in a smart card or variable. In particular in connection with money cards they are used for verifying the amount of money still stored in the money card. Such conventional pocket card readers are equipped merely with a keyboard for inputting the freely selected access code and PIN codes to be stored as well as optionally the serial numbers or other unique features of the associated cards, and software for carrying out of the above-described method for outputting and retrieving the PIN codes. If the unique feature is a characteristic physical property of the card which is detected automatically, the pocket card reader is equipped with a corresponding device. That is, the pocket card reader contains for example a program and device for executing an algorithm on the smart card and measuring the duration of execution of the algorithm.

Use of a pocket card reader has the advantage that it is very flat and has approximately the size of a smart card so that it can be taken along anytime.

BRIEF DESCRIPTION OF THE DRAWINGS

In the following the invention will be explained by way of example with reference to the two figures, in which.

DETAILED DESCRIPTION OF THE PREFERRED EMBODIMENTS

Figure 1:
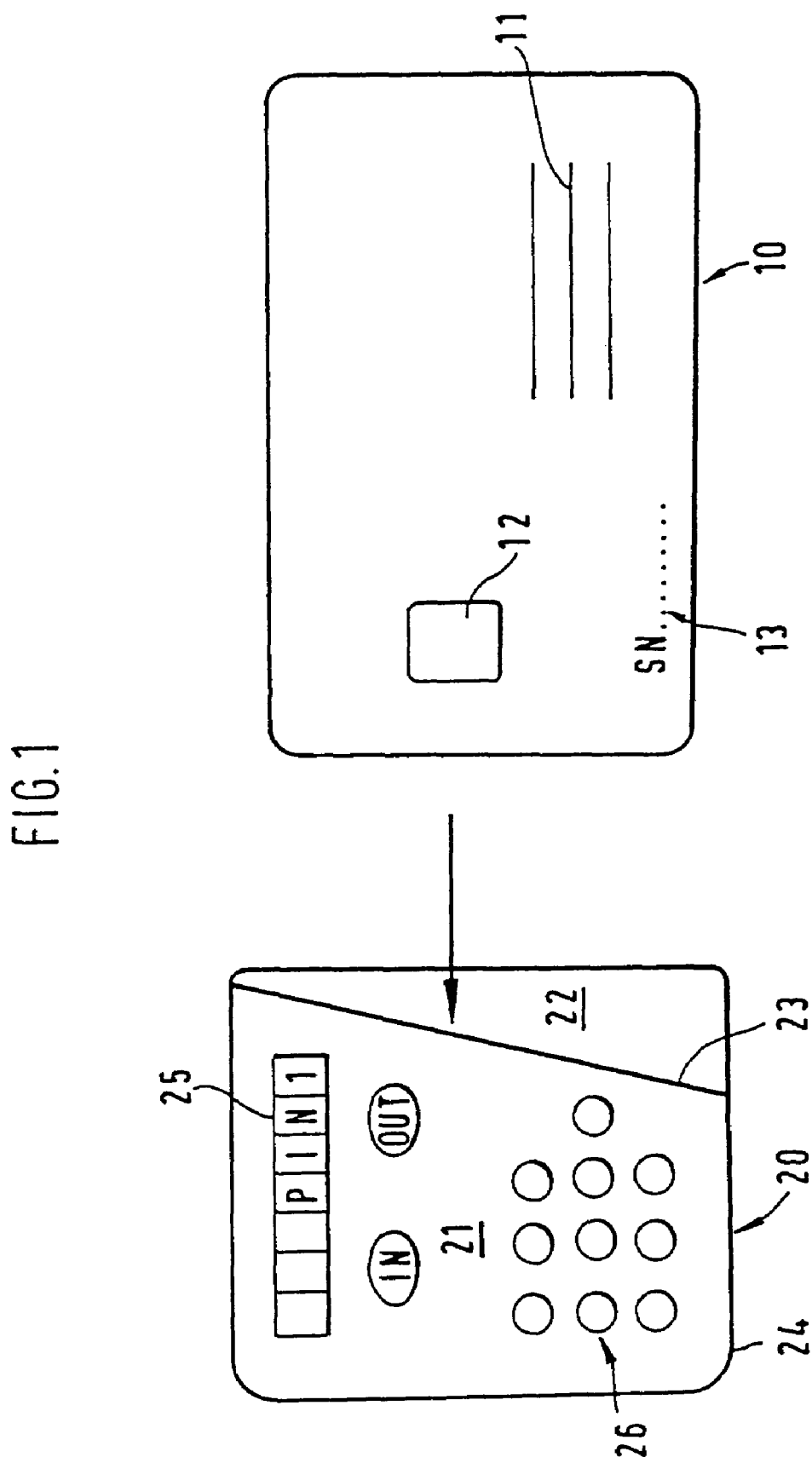
FIG. 1 shows smart card 10 and pocket card reader 20 for introduction of smart card 10.

FIG. 1 shows smart card 10 with chip module 12, writing box 11 and serial number 13. The smart card may be a money card or credit card or the like, and the entry of a secret PIN code is necessary before each access to a secret memory area of the chip in chip module 12 of smart card 10. The card can be inserted into pocket card reader 20 which is a little wider than smart card 10. For this purpose pocket card reader 20 has two platelike cover elements 21 and 22 interconnected at their edges 24 and forming between each other gap 23 into which smart card 10 is introduced, as shown by the arrow in FIG. 1. If the card is a money card, conventional pocket card readers indicate the amount of money stored in the money card without requiring the entry of a PIN code. If the user of the money card wants to increase the amount of money stored in the card at a bank machine, he must first input his PIN into the bank machine to be able to start the transaction. The card holder can store this PIN code in the pocket card reader with many other PIN codes so that he can retrieve them anytime, for example when he wants to perform a transaction for refilling the money card.

The method for storing and retrieving a number of PIN codes will now be described by the example of pocket card reader 20.

First, pressing button IN indicates to pocket card reader 20 that a freely selectable access code is to be inputted. The freely selectable access code is expediently inputted upon start-up of pocket card reader 20. It may also be provided that a plurality of users each having a plurality of smart cards use one pocket card reader. A plurality of access codes are then used, i.e. at least one access code per user.

Then the freely selectable PIN is inputted with the aid of numeric or alphanumeric keyboard 26 and subsequently confirmed by another pressing of button IN. The freely selectable PIN is stored at least for a short time period and henceforth used as the access code for the pocket card reader.

Next, a unique feature of smart card 10 is inputted into the pocket card reader and confirmed by pressing of button IN. The unique feature used may be for example serial number 13 of smart card 10. After entry of the unique feature the secret PIN stored in smart card 10 is inputted into the pocket card reader and likewise confirmed by pressing of button IN. One can also first input the secret PIN and then the unique feature of smart card 10. In any case display 25 leads the user through the program by indicating which information is to be inputted next. FIG. 1 shows in display 25 that the secret PIN code is to be inputted next, which occupies first memory area PIN1 as explained in the following.

Figure 2:
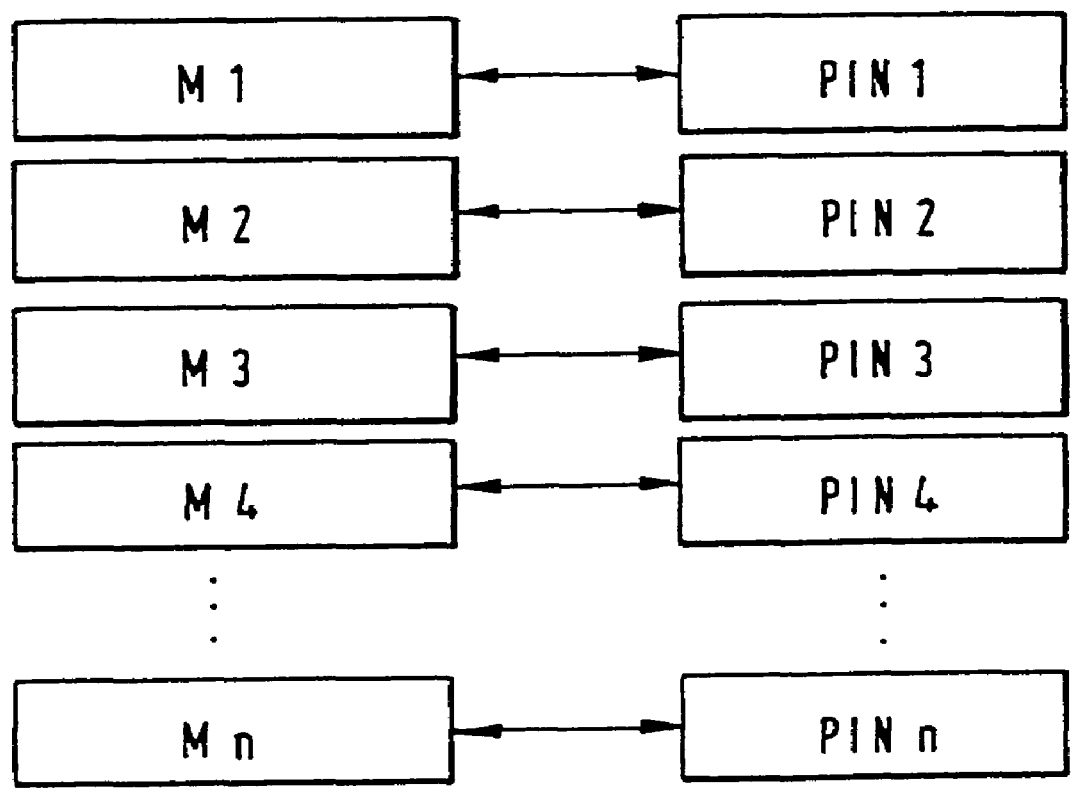
FIG. 2 shows the linking between memory areas M1 to Mn containing data on unique features with associated memory areas PIN1 to PINn in which the secret PIN codes are stored.

FIG. 2 specifies memory areas M1 to Mn and PIN1 to PINn. The inputted unique feature of smart card 10, serial number 13 of smart card 10 in this example, is stored in memory area M1 and the associated PIN is stored in memory area PIN1. The two memory areas are firmly linked together, as indicated by the double arrow. The storage process is thus ended. In the described way further unique features M2 to Mn can be stored with firmly associated personal identification numbers PIN2 to PINn. Memory areas M1 to Mn and PIN1 to PINn are externally inaccessible or unreadable. This also applies to the memory area in which the access code is stored.

Retrieval of a special stored PIN takes place analogously. Pressing button OUT indicates to pocket card reader 20 that an individual PIN is to be read. Pocket card reader 20 then asks the user to enter the access code, on the one hand, and enter the unique feature of the smart card whose individual PIN code is to be retrieved, on the other hand. In the above-described example, serial number 13 of smart card 10 is entered as the unique feature. After pocket card reader 20 has tested and confirmed the permissibility of the access code and after a comparison of the entered feature with the unique features stored in memory areas M1 to Mn has yielded a positive result in pocket card reader 20, display 25 indicates the individual PIN code associated with the unique feature found, i.e. the PIN code stored in memory area PIN1 in this example. The display ends after a few seconds, for example approximately 3 seconds, or after the card has been withdrawn from the pocket card reader.

If the entered access code was inadmissible or no stored unique feature can be found for the entered unique feature, display 25 indicates a PIN code that matches none of the PIN codes stored in memory areas PIN1 to PINn, alternatively indicating an error message In the above-described embodiment a unique feature of a smart card is linked with the PIN associated with said smart card by particular memory areas M1 and PIN1, M2 and PIN2, . . . Mn and PINn being firmly associated with each other. In an alternative embodiment, the data are linked by each stored secret PIN being encoded with the associated unique feature. Upon an attempt to retrieve the PIN stored in encoded form, the PIN stored in encoded form is decoded by means of the same unique feature. The linked memory areas are thus not hardwired but logically combined.

According to another embodiment of the invention it is provided that the freely selected access code is only stored temporarily. The access code must only remain stored as long as it is required for encoding the associated unique feature and optionally the individual PIN upon storage of individual PINs. After entry of a unique feature and the associated PIN, encoding of the unique feature and optionally the individual PIN with the access code, and storage of the encoded unique feature and optionally encoded individual PIN, the unique feature and the individual PIN are present in encoded form in the particular memory areas, while the access code used as a key is deleted. This ensures that anyone able to procure access to the individual memory areas without knowledge of the access code cannot interpret the contents of the memory areas.

At the beginning of retrieval of an individual PIN the access code and the unique feature of the smart card whose individual PIN is to be retrieved are inputted via keyboard 26. Then the inputted unique feature is encoded with the access code and it is then tested whether there is a counterpart to the thus encoded unique feature in memory areas M1 to Mn where the unique features of different smart cards were previously stored in encoded form. If this test yields a positive result, the PIN code linked therewith is indicated on display 25, optionally after decoding by means of the access code.

Card 10 need not be a smart card but may also be a magnetic stripe card for example. The invention is equally applicable thereto. If a smart card is involved, however, it is expedient to use an automated method for entering the unique feature. Instead of inputting a unique feature like the serial number via keyboard 26, the pocket card reader can also automatically determine a characteristic property or serial number of chip 12 contained in smart card 10 and use it as the unique feature. In the case of money cards for example, data transfer already takes place between pocket card reader 20 and chip 12 of smart card 10 in order to permit indication of the amount of money stored in the smart card. It is therefore readily possible to determine a characteristic physical property of the chip via the already realized contacting between chip 12 and pocket card reader 20. For this purpose, pocket card reader 20 causes an algorithm to be executed in chip 12, and the time it takes chip 12 to execute the algorithm is detected and used as the characteristic physical property of chip 12 and thus smart card 10. This process takes place automatically after smart card 10 has been inserted completely into gap 23 of pocket card reader 20 and the user of the pocket card reader indicates by pressing button OUT that he wants to retrieve the individual PIN associated with said smart card. The card holder need only input the previously freely selected access code via keyboard 26 into pocket card reader 20 in order to start the above-described comparison method of the characteristic physical property and obtain the indication of the individual PIN associated with card 10 on display 25. Any property may serve as a characteristic physical property if it is reliably detectable and specific to each card or its chip.

In principle, the automatic method for determining the unique feature as described above for a smart card is also possible with a magnetic stripe card which also has unique features like serial numbers. However, the structure of a suitable pocket card reader is more elaborate than in the case described above for a smart card.

The invention claimed is:

1. A method for storing and retrieving a number of PIN codes for protected access devices, comprising the following steps for storing the PIN codes:

entering and at least briefly storing an access code, entering and storing at least one PIN code of a protected-access device, automatically determining, entering, and storing at least one unique feature of at least one protected-access device, producing a link between one of the stored PIN codes and the stored unique feature of that device with protected access through the relevant PIN code;

and the following steps for retrieving a specific stored PIN code:

entering the access code, entering the unique feature of the protected-access device associated with the PIN code to be retrieved, testing whether the access code is permissible, testing whether the entered unique feature matches one of the stored unique features, and if both tests turn out positive, outputting the stored PIN code linked with the unique feature.

2. The method according to claim 1, including storing the stored access code permanently and testing the permissibility of the entered access code with reference to a comparison with the permanently stored access code.

3. The method according to claim 1, including storing the access code and/or unique features and/or PIN codes in encoded form.

4. The method according to claim 3, including using the access code as a key for encoded storage.

5. The method according to claim 4, including storing the access code only briefly and deleting the access code after encoding has taken place.

6. The method according to claim 4, including effecting the linking between the unique feature of a protected-access device and the associated PIN code by encoding the PIN code, and wherein the unique feature forms the key.

7. The method according to claim 1, wherein the access code and/or unique features and/or PIN codes are stored in externally inaccessible memory areas.

8. The method according to claim 1, wherein the particular serial number of the protected-access device is used as the unique feature.

9. The method according to claim 1, wherein a characteristic physical property of the protected-access device is used as the unique feature.

10. The method according to claim 1, wherein the output of the PIN code is made available only for a limited time period.

11. The method according to claim 1, wherein the protected-access devices comprise smart cards and/or magnetic stripe cards.

12. The method according to claim 1, wherein a wrong PIN code not stored is outputted if one of the two tests turns out negative.

13. An apparatus for storing and retrieving a number of PIN codes for protected-access devices, comprising a keyboard for entering the PIN codes and an access code, a first device for receiving unique features of the protected-access devices by automatically determining the unique features of the protected-access devices, at least one memory for at least briefly storing the access code, storing the PIN codes and storing the unique features, a second device for testing an entered access code as to its permissibility and comparing an entered unique feature with stored unique features, and a display for indicating retrieved PIN codes.

14. The apparatus according to claim 13, wherein the apparatus is a pocket card reader.

15. The apparatus according to claim 13 including a device for encoding the PIN codes and/or unique features and/or access code.

16. The apparatus according to claim 13, including externally inaccessible memory areas for storing the PIN codes and/or unique features and/or access code.

* * * * *